July 24, 1934.                     G. P. GRAY                     1,967,304
                              METHOD OF FUMIGATING
                              Filed Aug. 27, 1929
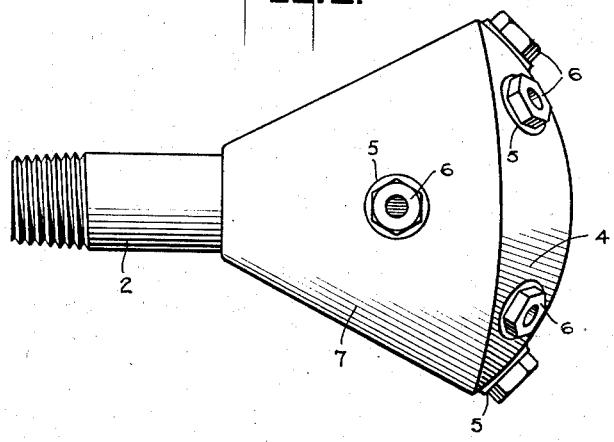
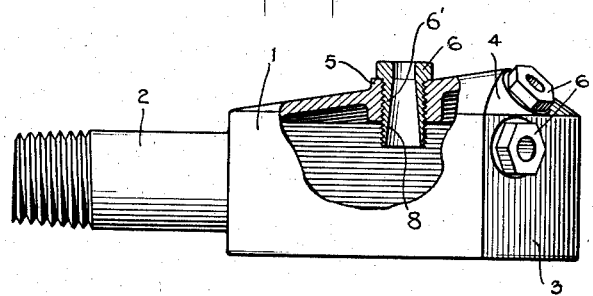
INVENTOR
George P. Gray
BY
ATTORNEY Patented July 24, 1934

1,967,304

UNITED STATES PATENT OFFICE 1,967,304

METHOD OF FUMIGATING

George P. Gray, Monrovia, Calif., assignor to American Cyanamid Company, New York, N. Y., a corporation of Maine Application August 27, 1929, Serial No. 388,754

2 Claims. (Cl. 43—124)

The present invention relates to a method of and an apparatus for injecting a fumigant to an enclosed space.

The invention is particularly concerned with spraying a fumigant to all parts of such a space quickly, so that a substantially uniform concentration will exist throughout the space at the earliest moment after fumigation has started.

It has been common practice heretofore, in fumigation with such toxic substances as hydrocyanic acid, to either inject the fumigant into the enclosed space as a liquid in the form of a spray, relying on evaporation and diffusion to disseminate the hydrocyanic acid throughout the space to be fumigated, or to first vaporize the hydrocyanic acid and then inject this substance as a gas. These typical methods are well illustrated in the patents to Cooper Nos. 1,642,920 and 1,454,154 respectively. While these methods are efficient for many types of fumigation, yet I have found them not satisfactory where a high initial concentration is desired in order to secure a quick kill.

Fumigation with liquid HCN for the eradication of scale from citrus trees has been in use with great success for a considerable number of years. Although satisfactory control of scale can ordinarily be obtained with liquid HCN, there is a type of scale known as "resistant" scale which is not readily eradicated by fumigation. Many attempts have been made to control this type of scale, but without material success. It has been the general view that eradication of such scale is a factor of the concentration of fumigant and the time of exposure of the insects. Based upon this belief, various methods have been tried, but none of them have met with success.

I have made a study of the problem and have discovered, as set forth in my co-pending application Serial No. 356,624, filed April 19, 1929 now Patent No. 1,927,517, dated September 19, 1933 that the basis upon which the previous methods were founded was incorrect and that the time element of fumigation was not of vital importance. I discovered that unless a high concentration of the fumigant is obtained in a very short time, this "resistant" scale cannot be successfully controlled as it appeared from my experiments that when the concentration of fumigant increased slowly to the toxic point there was a stupefaction of the insects which protected them from the toxic effect of the fumigant, even though they were exposed to the fumigant for a very long time. The idea involved in my discovery is described and claimed in said co-pending application, and the present invention is directed to one of the numerous ways of obtaining the high initial concentration which I have found essential for adequate control of "resistant" scale and other insects.

To this end, the invention in one of its aspects contemplates the use of a multiple jet nozzle, each orifice of which will be of substantial size and so arranged that a plurality of diverging streams of toxic material may be ejected therefrom under material velocity, with the result that the force of the streams will carry the fumigant to all parts of the space being fumigated, quickly and in uniform concentrations.

The invention further consists in the construction of the instrumentalities shown and described and their manner of use as more particularly pointed out hereinafter.

In the drawing:

Fig. 1 is a plan view of a nozzle constructed according to this invention, and

Fig. 2 is a side elevation of the device of Fig. 1 partly in section.

The nozzle proper shown in the drawing may conveniently ocmprise a hollow shell 1 of substantially fan-shaped configuration having a tubular portion 2 adapted to be inserted into a hose or the like normally used to supply the toxic substance. The shell 1 is provided with a substantially arc-shaped lower front wall 3 and an upper curved section 4 each of which is provided with bosses 5 cast in the shell and adapted to receive nozzle jets 6.

In like manner the top of the shell 7 is provided with a similarly formed boss 5 into which is screwed a jet 6.

The jets proper comprise an exteriorly threaded tubular section 6′ having an axial aperture therethrough of substantially frustro conical configuration shown generally at 8. It has been found that this form of aperture causes high stream velocity which is desirable inasmuch as it tends to increase turbulence within the space being fumigated.

As clearly shown in the drawing, the jets 6 are so arranged in the shell 1 that a plurality of diverging streams of fluid are adapted to be ejected therefrom, the jets in the lower front wall projecting streams horizontally, the jet in the top wall 7 ejecting a stream vertically above the shell, and the jets in the curved upper section 4 streams at an angle between the horizontal and vertical.

In using the instrumentalities above described, it is to be noted that this nozzle need only be inserted just within the space to be fumigated and at substantially the ground or floor level thereof, and upon pumping or forcing the fumigant out of the jets, diverging streams are directed into all parts of the enclosed space. Inasmuch as these streams are of material size, and it is contemplated that the force behind them will be of sufficient intensity to develop a momentum to the fumigant particles, such that the fumigant will be instantly carried to all parts of the space being fumigated at a minimum time after fumigation has started. This manner of use of the nozzle is obviously a very different procedure from the usual spray which has for its purpose simply the breaking up of the fumigant particles into minute masses, as with the present invention the nozzle is not only relied upon to atomize but also is for the purpose of causing instant and widespread diffusion of the fumigant throughout the enclosed space.

Obviously the invention contemplates either the ejection of a fumigant in the form of a dust, a gas, or fine particles of liquid carried by a fluid vehicle such as air, nitrogen, carbon dioxide or the like. In the latter case reliance may be had upon the natural heat of the space being fumigated or air currents therein to cause evaporation of the liquid droplets, but with the present invention this method will be found efficient due to the fact that the droplets are initially projected under considerable force to all parts of the space with consequent uniform concentration.

It is to be noted that where the fumigant dosage is distributed through the present nozzle over a prolonged period of time, that the presence of these diverging streams under material force serves to maintain the fumigant previously injected under constant turbulence, and this is desirable to maintain uniform concentrations throughout the fumigation period.

Obviously, it is not necessary that all of the jets have orifices therein of uniform size, as it may well be in fumigating a space which is longer than it is high that the jets provided for the horizontal streams will require an orifice of such dimensions as to inject a stream the full length of the space under the same pressure or force required to project a stream upwardly to the complete height thereof, a shorter distance.

While a specific embodiment of the invention has been here illustrated and described, yet obviously I do not wish to be limited specifically thereto, but the invention is to be considered in its broadest aspect consistent with the scope of the claims.

What I claim is:

1. A method of fumigating within a closed space which consists in expelling into said space a liquid fumigant of low boiling point, said fumigant being projected substantial distances into the space in liquid form without substantial diffusion as a relatively small number of concentrated streams of liquid varying in cross-sectional area and velocity, and obtaining thereby in said space diverse centers of dispersion at different distances from the points of origin of the streams from which the fumigant of the projected streams spreads to all surrounding areas of the space and rapidly produces therein a killing concentration of fumigant vapor.

2. A method of fumigating within a closed space which comprises supplying a volatile fumigant under pressure to a hollow, multiple-jet nozzle in the lower part of said space and projecting said fumigant from the nozzle in liquid form in a relatively small number of divergent streams of liquid of substantial area in cross-section, said pressure being sufficient to project said streams to points remote from said nozzle before dispersion takes place, whereby there are produced in said space diverse centers of dispersion from which the fumigant of the projected streams spreads to all surrounding areas of the space and rapidly produces therein a killing concentration of fumigant vapor.

GEORGE P. GRAY.